CORE STORAGE DEVICE

Filed Dec. 31, 1962 2 Sheets-Sheet 1

INVENTORS
WILLIAM E. BURNS
QUENTIN E. CORRELL
By Carl W. Laumann Jr.
ATTORNEY

July 18, 1967 Q. E. CORRELL ETAL 3,332,066

CORE STORAGE DEVICE

Filed Dec. 31, 1962

2 Sheets-Sheet 2

United States Patent Office 3,332,066

Patented July 18, 1967

3,332,066

CORE STORAGE DEVICE

William E. Burns, Los Gatos, and Quentin E. Correll, San Jose, Calif., assignors to International Business Machines Corporation, New York, N.Y., a corporation of New York Filed Dec. 31, 1962, Ser. No. 248,778

1 Claim. (Cl. 340—172.5)

This invention relates generally to a data storage device for use in an electronic data processing system, and particularly to a multi-character, word oriented system capable of handling data in parallel according to data words or in the serial by character mode.

Data processing systems frequently use storage systems such as those of bi-stable magnetic cores or other coincident drive arrays to provide a temporary or working storage for a large number of data registers contained in a control processing unit. In a typical central processing unit such storage systems are used to keep track of various main storage addresses involved in the data manipulation being performed.

Considerable time can be saved by modification of these addresses in a manner which permits them to be used over and over during a lengthy data manipulation. An example of such modification is indexing. A further description of indexing is contained in R. K. Richards' Arithmetic Operations in Digital Computers, copyright 1955, D. Van Nostrand Company, Inc., at pages 348 and 377.

Where a central processing unit contains a serial, single character adder, the adder must process the entire word, character by character, even though certain characters do not equire modification. A substantial improvement could be effected if only selected characters could be operated upon. A serial type of readout is desirable for this purpose. However, in an internal transfer involving only two registers, it may be desirable to proceed in the parallel mode and transfer words at a time instead of single characters.

There are advantages to the parallel mode for one type of data manipulation and the serial mode for other types of data manipulations. Unfortunately, the hardware requirement for a serial-parallel mode device renders it impractical since the cost is greater than the benefit to be derived.

It is, therefore, an object of our invention to provide an improved data storage system.

It is another object of our invention to provide a storage device for multiple character data words.

Still another object of our invention is to provide a storage device for operation in a serial or parallel mode.

A further object of our invention is to provide a multi-character word storage register which may be read out of, or written into, serially by character or parallel by word.

The foregoing and other objects, features and advantages of the invention will be apparent from the following more particular description of preferred embodiments of the invention, as illustrated in the accompanying drawings.

The storage elements of the device consist of a number of multistable elements arranged in rows and columns in the conventional array. Each of the elements is adapted to store a bit of information. Groups of elements in the same row are designated characters and each word has a plurality of characters. The array is arranged so that corresponding characters in each word appear in the same columns. For example, character 1 of word A will be found in columns 1, 2 and 3 of row A. Character 1 of word B is found in columns 1, 2 and 3 of row B. In the preferred embodiment each row defines a single, multi-character word.

The storage system follows the well known coincident drive technique in which an element or group of elements is selected by applying drive signals to the row and column drives associated with the desired elements. The outputs of the drivers coincide in the predetermined elements to either store a data signal therein or to read out the data previously stored at that location.

During a write operation the driver for the selected row is energized and the individual column drivers are energized in accordance with the data contained in the word to be stored. Those elements which are associated with both the energized row and the energized column lines will be fully selected and change state to record the data therein. This portion of the system operates in a straightforward manner.

During a read operation a full select drive current is supplied to all those elements which are being interrogated. For a parallel mode read operation a full select read drive current is supplied to all elements of the row. To accomplish the serial mode read a full select current is supplied to only elements in the desired character to prevent the destruction of data in the other character positions.

To avoid the necessity for separate serial read drivers for each column, the read windings for all columns within a single character are series connected to one driver. When serial read operation is desired, the column character drivers are energized in sequence. To provide parallel read operation the column character drivers are energized simultaneously. By connecting the column bit windings for one character position in all rows to a single read driver, the number of drivers required to provide both serial and parallel modes is substantially reduced and the problems of timing are also lessened.

The bistable elements are arranged in rows A, B, C and columns $P_1$, $P_2$, $P_4$, $Q_1$, $Q_2$, $Q_4$ and $R_1$, $R_2$, $R_4$ to provide a word-oriented storage system. Each of the rows A, B and C define a data word. The columns each define a data bit with the column groups P, Q and R representing character positions within the data word. The word A has characters P, Q and R with each character including a 1, 2 and 4 bit. While but three, 3-character, words are shown, the system may be modified to provide any convenient combination of words, characters and bits.

Transition of the elements from one state to another is accomplished by properly directed coincident current drive means well known in the art. One-half of the requisite drive current is applied by the row axis drivers and the other half is developed by the column drivers. A data bit is stored, or the location cleared, or interrogated by the properly directed row and column drive currents coinciding in the desired elements.

Figure 1:
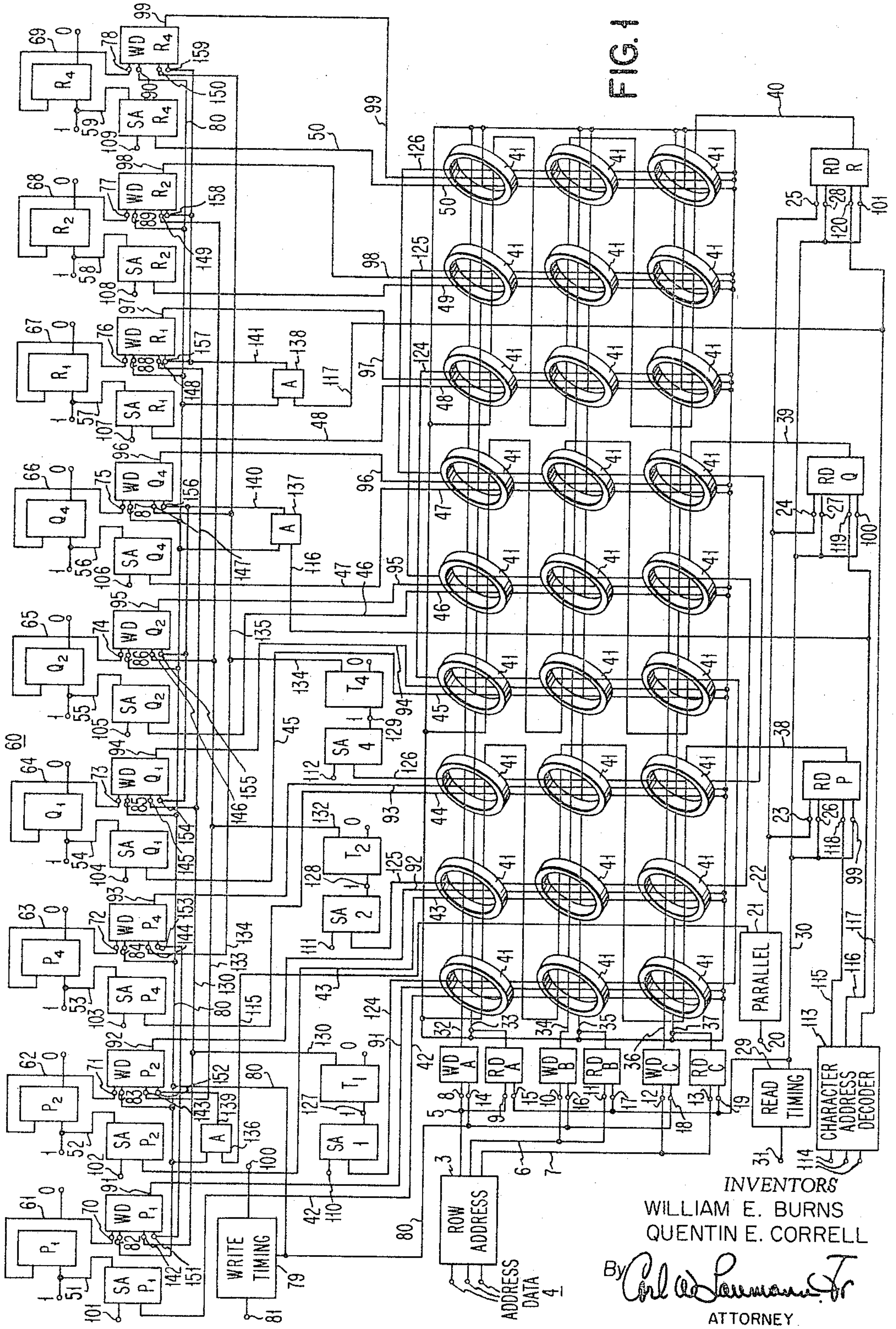
FIG. 1 is illustrative of the preferred embodiment of our invention.

The system shown in FIG. 1 has a read cycle which data is removed from storage and a write cycle in which data is recorded in storage. Either operation may be performed in the serial or parallel mode. Both read and write cycles include selecting a row address, selecting the column addresses, and the development of drive currents in response to timing pulses.

While the row address selection is substantially the same for both cycles in either mode selection of the column addresses differs for the various operations. The parallel-read parallel-write, serial-read serial-write operations are considered in that order.

In the case where the controlling circuits requires a parallel transfer of data, the operation begins with a presentation of the desired row address information to the row address decoder 3 by means of suitable signals at the input terminals 4. The row address information presented by the controlling circuits are transformed by decoder 3 into a row select signal on one of lines 5, 6 and 7 connected to the gate inputs 8–9, 10–11 and 12–13 of row drivers WD–A, RD–A, WD–B, RD–B, WD–C and RD–C, respectively.

The signal at the gate input to the row drivers does not produce a driver output, but merely conditions the driver to respond to a clock pulse at one of the timing inputs 14–19. Derivation of the clock pulse and a description of the driver circuit are covered later.

At essentially the same time the row address is presented to the row address decoder 3, the controlling circuits develop a parallel mode signal at terminal 20 of parallel read selector 21 which in turn provides a signal on line 22.

The column read drivers RD–P, RD–Q and RD–R have gate terminals 23, 24 and 25 of their upper inputs connected to line 22 of the parallel read selector 21. In a manner similar to that of the row driver, the column read drivers do not produce an output directly on receipt of the gate signal at terminals 23, 24 and 25. This signal merely conditions the drivers to respond to a clock pulse at the timing inputs 26, 27 and 28.

Timing pulses for the parallel read operation are produced by read timing unit 29 on line 30 in response to appropriately timed signals at terminal 31 from the controlling circuits. The read clock pulses are emitted on line 30 connected to timing inputs 14–19 and 26–28, subsequent to the conditioning of the appropriate driver inputs by the gating signals.

In response to the clock pulses, all drivers having conditioned inputs will produce half select currents on their respective output lines. Row drivers WD–A, RD–A, WD–B, WD–C and RD–C have output or drive lines 32–37, respectively. Similarly, column drivers RD–P, RD–Q and RD–R have drive lines 38, 39 and 40.

In the subsequent descriptions positive remanence is defined as the state of a bistable element that corresponds to the state of a trigger storing a binary 1. Negative remanence corresponds to the state of a trigger storing a binary 0.

The currents through row drive lines 32, 34 and 36 that thread the bistable elements 41 in array 42 are in a direction opposite to the currents through row drive lines 33, 35 and 37. For the read operation, one of the drivers RD–A, RD–B or RD–C will be selected to produce a half select current on one of lines 33, 35 or 37 which drive all the elements in the selected row toward negative remanence.

Column drive lines 38, 39 and 40 each thread all these bistable elements 41 which define a character. It will be seen that drive line 38, for example, threads the first three elements in each row, line 39 the second three elements, and line 40 the last three elements.

Since all the read column drivers are selected, there will be half select currents on drive lines 38, 39 and 40. One row will have a half select current on one of lines 33, 35 and 37. The row and column drive currents coincide in the desired row to drive the elements in that row to negative remanence. Those elements which were previously at positive remanence change state and in so doing induce a current in the associated sense windings 42–50, one of which traverses each column of elements.

Each column of elements 41 has a sense amplifier: SA–$P_1$, SA–$P_2$, SA–$P_4$, SA–$Q_1$, SA–$Q_2$, SA–$Q_4$, SA–$R_1$, SA–$R_2$ and SA–$R_4$ connected to the sense winding for the column. When the coincident read currents produce a pulse on the sense winding, the sense amplifier increases the amplitude of the pulse and provides a signal on lines 51–59 which is effective to set the associated trigger of the group $P_1$, $P_2$, $P_4$, $Q_1$, $Q_2$, $Q_4$, $R_1$, $R_2$ and $R_4$ which make up the data register 60.

The sense amplifier outputs on lines 51–59 are connected to the binary 1 inputs of the triggers. Since all the triggers of register 60 were initially in the binary zero state, the amplified pulse through the sense amplifiers change register 60 to represent the data read from the selected row of elements. This completes the read operation and the controlling circuits are free to operate on or use the data extracted from storage.

When the controlling circuits have completed their operation on, or have used the data read from storage, the modified data may be replaced at the same location. In other cases, it may merely be desired to replace the data unmodified so that it can be used in the future. Assuming that modified data is to be placed into storage, the controlling circuits clear register 60 by applying signals to the zero input and then enters the modified data by setting the appropriate triggers with suitable signals applied to the inputs.

The triggers in register 60 have output lines 61–69 connected to gate terminals 70–78 of write drivers WD–$P_1$, WD–$P_2$, WD–$P_4$, WD–$Q_1$, WD–$Q_2$, WD–$Q_4$, WD–$R_1$, WD–$R_2$ and WD–$R_4$, respectively. When the triggers are in the binary 1 state, the associated output line conditions the connected driver to respond to a clock pulse at one of the timing inputs 82–90.

The controlling circuits present the row address to row address decoder 3 at terminals 4 as previously described for the read operation. While the usual operation will be to write at the same location as that from which the data was read, it is also possible to change the row address and write at a different location if desired. The row address decoder 3, by means of an output signal on one of the lines 5, 6 and 7 connected to gates 8, 10 and 12, respectively, conditions one of the row drivers to respond to the write timing signal.

Subsequent to the application of a gate signal to the write drivers, write timing unit 79 develops a write timing pulse on line 80 in response to a signal from the controlling circuits at terminal 81. The write timing or clock pulse on line 80 causes these drivers having conditioned inputs to produce half select output currents on their respective output lines.

The resultant column half select write currents on the column write drive lines 91–99 and the row half select write current on one of the row write drive lines 32, 34 and 36 coincide in the elements 41 in the selected row which are to be changed from negative to positive remanence to represent the data contained in register 60.

Because the flux reversal during the write operation induces a current in the sense windings similar to that for the read operation, it is desirable to inhibit the sense amplifier response. To this end, write timing unit 79 develops at output terminal 100 an inhibit signal to all sense amplifiers. Means not shown on the drawing connect terminal 100 to the inhibit input terminals 101–112 of the sense amplifiers. The inhibit signal is developed prior to the appearance of the disturbance on the sense windings and remains until the write operation is complete.

When the controlling circuits require a serial transfer of data the read operation begins with a presentation of the desired row address information at the terminals 4 of the row address decoder 3. Row address decoder 3 operates in the manner previously described to develop a row select signal on one of lines 5, 6 and 7 connected to the gate inputs 8–9, 10–11 and 12–13 of the row drivers.

During a serial read operation only one character at a time is read out from storage. This requires that a character address be specified in addition to the row or word address. The controlling circuits present the character address information to the character address decoder 113 at input terminals 114. This information is transformed by decoder 113 into a character select signal on one of lines 115, 116 and 117 connected to the gate terminal 118, 119 and 120 of the lower inputs to read drivers RD–P, RD–Q and RD–R, respectively. While the parallel read mode requires all the column read drives to be active, the serial read mode involves selection of a single column read driver.

Subsequent to the development of the row and character select signals, the read timing unit 29 produces a clock pulse on line 30 connected to timing inputs 121, 122 and 123 of the column read drives RD–P, RD–Q and RD–R and timing inputs 15, 17 and 19 of row read drivers RD–A, RD–B and RD–C.

At the occurrence of the read clock pulse, half select read currents are produced on one of the drive lines 33, 35 and 37 by the selected row read driver and one of the drive lines 38, 39 and 40 by the selected column read driver.

These currents coincide in the elements which make up the desired character in the selected word to drive those elements to negative saturation. As was the case with the parallel read operation, those elements which were previously set to positive remanence, change state and in so doing induce a current in the sense windings. The serial read operation utilizes sense windings 124, 125 and 126. These windings are wound to include all elements of a particular bit in all characters and all words. Thus, winding 124 indicates a 1 bit, winding 125 a 2 bit and winding 126 a 4 bit.

The inputs to sense amplifiers SA–1, SA–2 and SA–4 are connected to sense windings 124, 125 and 126, respectively. The amplified signal from sense windings 124, 125 and 126 appears on output lines 127, 128 and 129, respectively. These output lines connect to the 1 input of triggers $T_1$, $T_2$ and $T_4$ so that a pulse on the sense winding is effective to set its associated trigger to the 1 state.

Trigger $T_1$ has an output line 130 connected to data line 131 representing a 1 bit in the character read from storage. Similarly, triggers $T_2$ and $T_4$ have respective output lines 132, connected to the 2 bit data line 133 and output line 134 is connected to the 4 bit data line 135.

Data lines 131, 133 and 135 provide paths for the transfer of data back into storage at the same or different locations. It will be understood that the controlling circuits are connected to the trigger output lines 61–69 and 130, 132, 134 to obtain the information from storage and likewise have connections to the zero and 1 inputs to the triggers in register 60 and $T_1$, $T_2$ $T_4$ so that the modified data may be replaced therein.

The serial read operation is complete when the desired character appears as signals on data lines 131, 133 and 135. If another character is required, a second read operation is performed with the new character address at terminals 114 of character address decoder 113.

The serial write operation customarily follows the serial read. Assuming that a serial read operation has been completed and the controlling circuits have set the triggers $T_1$, $T_2$ and $T_4$ tothe desired state, the operation proceeds with the customary row address information at the input terminals 4 of row address decoder 3. As was the case with parallel write, this address may be the same or a previously cleared location in storage. The row address decoder conditions one of the row write drivers, by means of a signal on one of lines 5, 6 and 7 to respond to the write timing signal.

The character address information is presented to the character address decoder 113 at terminals 114 by the controlling circuits. A signal on one of the output lines 115, 116 and 117 from decoder 113 selects the particular column write drivers to be used through one of And gates 136, 137 and 138 which direct the write timing pulses to the lower input of the drivers for the P, Q or R characters.

In the case where it is desired to write into the Q character address, an output signal is produced on line 116 connected to one input of And gate 137. The signal conditions And gate 137 to pass the write timing pulse to output line 140, which is connected to the timing input of write drivers WD–$Q_1$, QD–$Q_2$ and WD–$Q_4$. Data bits are loaded into triggers $T_1$, $T_2$ and $T_4$ which have output lines 130, 132 and 134 connected to data lines 131, 133 and 135, conditions the gate terminals 142–150 of the lower inputs to the column write drivers. While corresponding bits of all characters are conditioned, the desired character is selected by selective application of clock pulses to the timing inputs 151–159.

In the example selected where a Q address is to be used, the write timing pulse passes from line 80 through And gate 137 to output line 140 which causes those drivers WD–$Q_1$, WD–$Q_2$ and WD–$Q_4$ which are conditioned to produce half select output currents on their corresponding output lines 94, 95 and 96.

There is a half select row write current developed by one of the row write drivers WD–A, WD–B and WD–C as described in the parallel write operation. The row and column write currents coincide in the desired elements of the Q character in the desired row to drive them to positive saturation indicative of the corresponding bits represented in triggers $T_1$, $T_2$ and $T_4$.

In this manner, the desired data is written at the selected location which may be the same or a different location relative to the location for the previous read operation.

The inhibit output at terminal 100 functions the same as for a parallel write operation.

Figure 2:
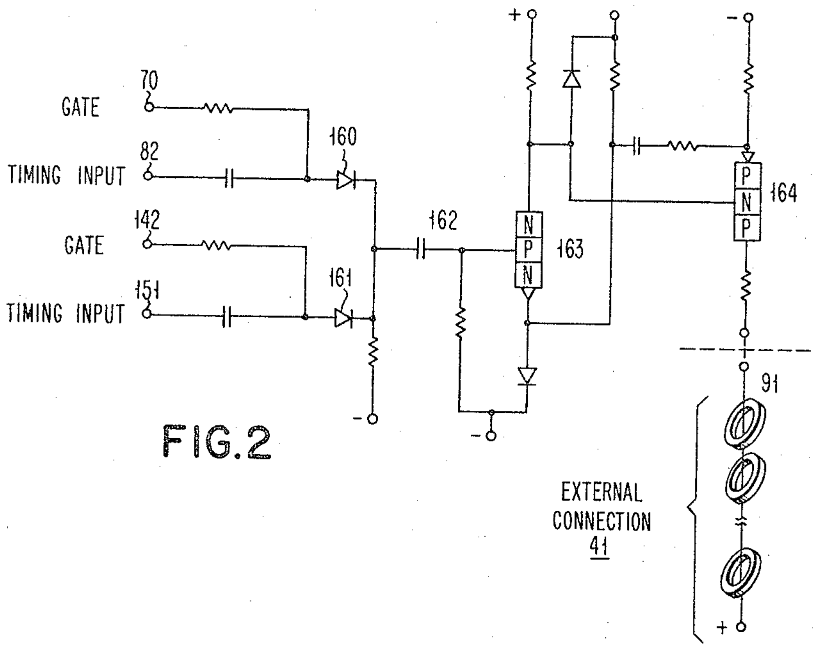
FIG. 2 is a schematic drawing for a driver circuit which may be used in the preferred embodiment of the invention.

FIGURE 2 illustrates the circuit used for the read and write drivers and particularly that of WD–$P_1$. When a positive signal is present at gate terminals 70 or 142, the positive going pulse at timing inputs 82 or 151 passes through diode 160 or 161 and capacitor 162 to turn on transistor 163. Conduction between emitter and collector of transistor 163 causes the base of transistor 164 to go negative. Transistor 164, therefore, conducts between emitter and collector to provide the half select drive current through the elements 41.

Figure 3:
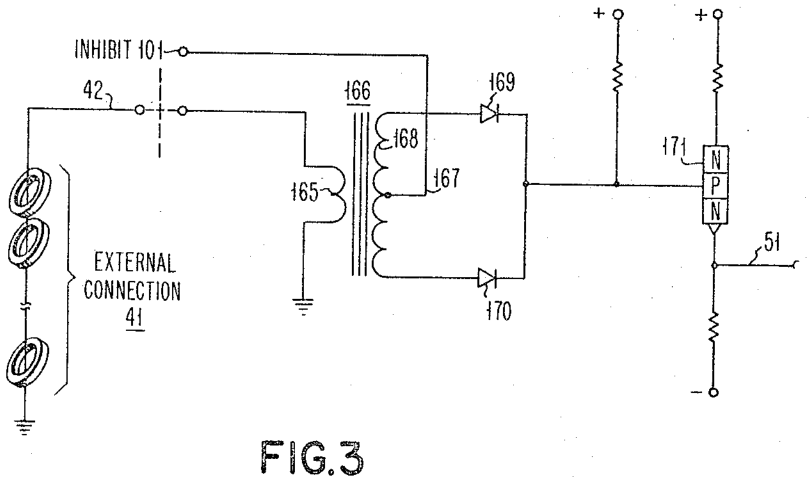
FIG. 3 is a schematic drawing of the gating circuitry used for the sense amplifiers in the system of FIG. 1.

FIGURE 3 illustrates the circuit used for the sense amplifiers and, particularly, that of SA–$P_1$. The sense winding 42 is connected to the primary winding 165 of transformer 166. The center top 167 of secondary winding 168 is connected to inhibit input 101. A negative voltage at terminal 101 back biases diodes 169 and 170 so that no signal can pass to the base of transistor 171 and, therefore, no output appears at terminal 51.

When the negative voltage is removed from terminal 101, the diodes 169 and 170 are able to conduct the signal from secondary winding 168 to the base of transistor 171. The amplified signal then appears at terminal 51.

While the invention has been particularly shown and described with reference to a preferred embodiment thereof, it will be understood by those skilled in the art that various changes in form and details may be made therein without departing from the spirit and scope of the invention.

The invention claimed is:

In a data storage device having a plurality of multistable elements arranged in columns and rows wherein each row defines a data word having a plurality of multiple bit characters and each column defines corresponding bits in every word, coincident drive means for altering the state of selected elements of said device by character or word comprising, word write drivers, means for energizing a selected of said word write drivers to partially select all the elements in a desired row for a write operation, word read drivers, means for energizing a selected of said word read drivers to partially select all the elements in a desired row for a read operation, column write drivers, individual drive lines connecting said first column write drivers to all the multistable elements in a column, means for energizing said first column write drivers coincidentally with said word write drivers in accordance with the data to be stored to fully select the desired bit positions in the partially selected row, column read drivers, individual drive lines connecting said column read drivers to all the bit positions of corresponding characters in each row, and control means for developing serial and parallel addresses, means connecting said control means to said column read drivers to energize all said column read drivers coincidentally with the selected of said word read drivers in response to a parallel address, and to selectively energize a predetermined of said column read drivers coincidentally with the selected of said word read drivers in response to a serial address to simultaneously fully select all bit positions of the desired word in response to a parallel address and to simultaneously fully select all bit positions of a single character in response to a serial address, a character register, a word register, a plurality of serial sense windings, each said serial sense winding including all multistable elements which define corresponding bits in each character of every word, the output of said serial sense windings being connected to said character register, a plurality of parallel sense windings, each said parallel sense winding including the multistable elements which define a single column, the output of said parallel sense windings being connected to said word register, whereby data read from a serial address is placed in said character register and data read from a parallel address is placed in said word register.

References Cited

UNITED STATES PATENTS

| | | | |
|---|---|---|---|
| 2,931,014 | 3/1960 | Buchholz et al. | 340—174 |
| 2,957,163 | 10/1960 | Kodis | 340—172.5 |
| 3,108,257 | 10/1963 | Buchholz | 340—172.5 |
| 3,129,411 | 4/1964 | Albrecht | 340—174 |

OTHER REFERENCES

Pages 125–129, 203 and 204, 1960, Irwin, Digital Computer Principles, D. Van Nostrand Co., Inc.

ROBERT C. BAILEY, *Primary Examiner.*

R. M. RICKERT, *Assistant Examiner.*